April 22, 1969
D. C. POST
3,440,590
FASTENER DEVICE
Filed March 10, 1966
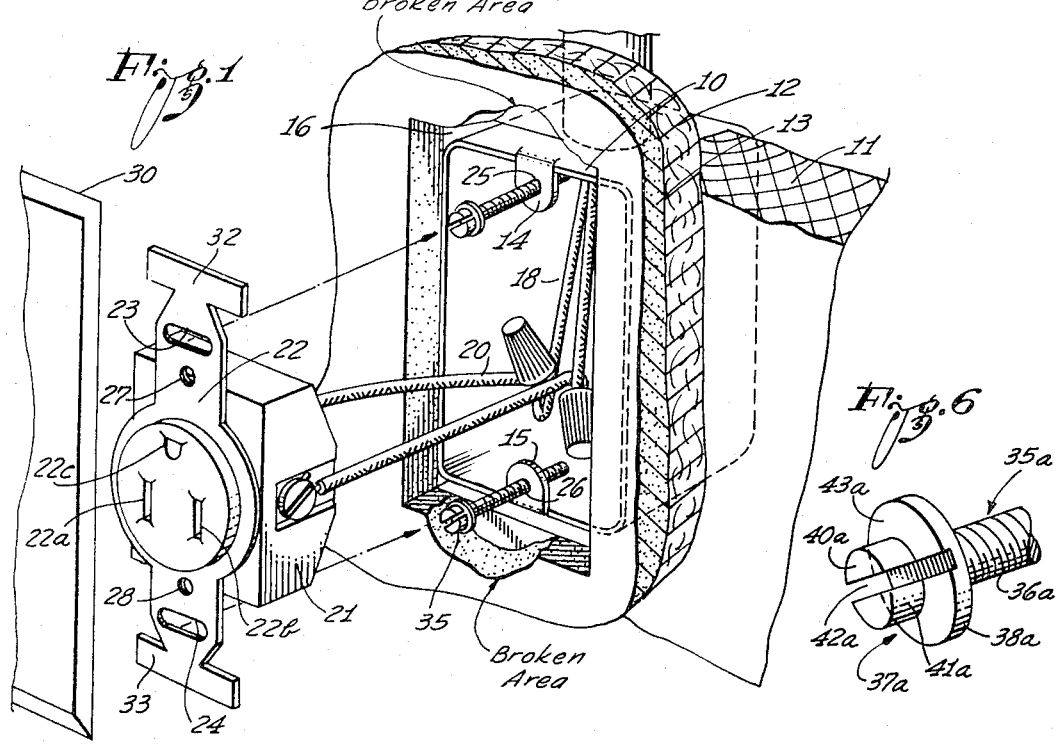
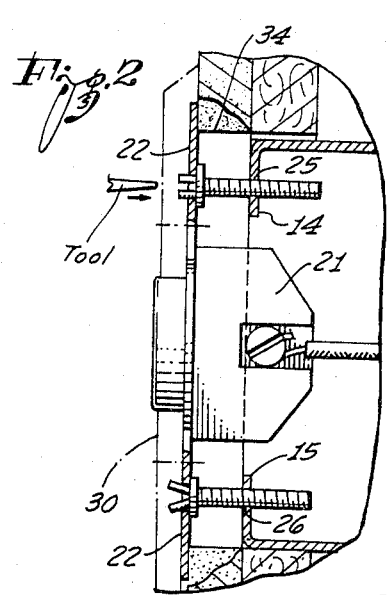
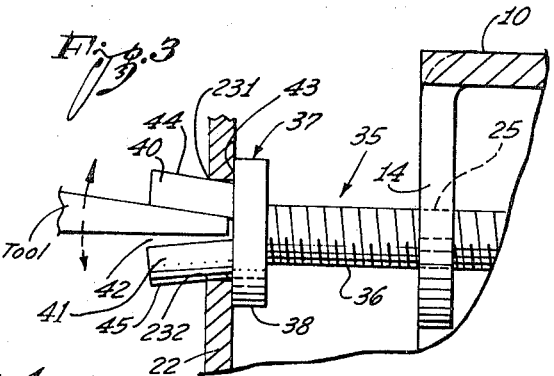
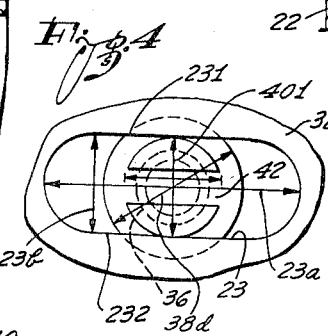
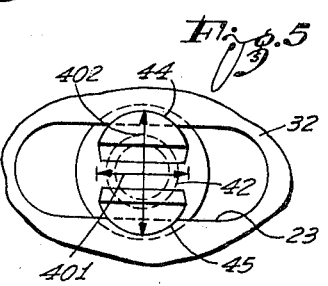
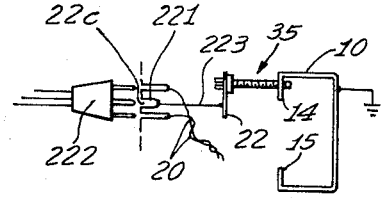
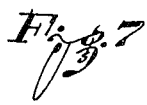
INVENTOR
DAVID C. POST
ATTORNEYS

United States Patent Office 3,440,590
Patented Apr. 22, 1969

3,440,590
FASTENER DEVICE
David C. Post, 3717 Barcelona Drive,
Santa Barbara, Calif. 93105
Continuation-in-part of application Ser. No. 369,466,
May 22, 1964. This application Mar. 10, 1966, Ser.
No. 533,346
Int. Cl. H01r 3/06; H02b 1/02; F16b 39/00
U.S. Cl. 339—14
7 Claims

ABSTRACT OF THE DISCLOSURE

An electrical outlet receptacle is mounted to an outlet box, being installed in a wall, by means of locking screws threadedly received in the box. The screws each have shoulders and from a shoulder extend upstanding portions respectively defining a screwdriver slot. The receptacle has two fastener lugs ("plaster ears") with elongated slots, through which are passed the upstanding portions. These upstanding portions are spread to clinch the lugs against the shoulders. Turning of a screw by 90° permits release of the receptacle. The lugs may be connected to a ground terminal in the receptacle and when clinched provide electric connection to the grounded box.

---

The present invention is a continuation-in-part application of my copending application Ser. No. 369,466, filed May 22, 1964, now abandoned. This invention relates to electrical wiring installations and in particular to improvements for locking and grounding effectively and conveniently electrical receptacles such as provided for outlets or switches and for mounting such receptacles in electrical outlet boxes.

Electrical outlet boxes are usually installed during the rough construction of a building and their spacing with respect to the finished outside wall cannot be readily determined, resulting in considerable adjustment in the mounting of an electrical receptacle in the outlet box aligned or flush with the surface of the wall. This adjustment is further complicated by the fact that often the surrounding plaster or other construction material is often mutilated, and the conventional electrical receptacle normally requires the surrounding plaster or other construction material for its support when installed.

Also, the conventional installation of receptacles and outlet boxes requires the installer to place one or both of the locking screws through the preformed openings in the receptacle and then attempt to thread the screws into the tapped openings in the ears of the outlet box which is not only difficult to do under adverse working conditions, but also sometimes results in injury to the threading of the tapped holes in the outlet box, damaging the box. Further, it is most difficult to align the electrical receptacle under these conditions and particularly when the support for the electrical receptacle is damaged as aforesaid..

As will be clear from a more detailed explanation hereinafter, by providing a locking screw with a head having a shoulder and upstanding portions which are deformable by an instrument such as a screwdriver, the installer may first thread the locking screws into the tapped hole of the ears of the outlet box to a distance which the electrical receptacle will enter the outlet box and then place the holes in the electrical receptacle over the upstanding portions of the head of the locking screw against the shoulder so that the latter stops further inward movement of the electrical receptacle. If, in this position, the installer finds that further adjustment is necessary, he can make a more fine adjustment by simply turning the screw in one direction or the other without removal of the receptacle. Once having the correct positioning of the electrical receptacle with respect to the wall, by simply aligning the screwdriver slots of the respective screws with respect to the openings in the electrical receptacle and deforming the slot, the receptacle is clinched or locked on the locking screw.

The receptacle will include a metallic mounting bar or yoke having holes for receiving the locking screw or screws. This mounting bar is usually electrically connected to connectors inside of the receptacle which connectors receive a ground connector prong of a plug. Since the outlet box is grounded, the locking screw provides positive electrical connection between the ground connector in the receptacle and the grounded outlet box.

It is noted that while numerous attempts have been made to provide a locking screw which will perform the above operation, such locking screws have been defective in that either the screw itself did not provide a stop for the electrical receptacle upon its initial installation and/or if further or more refined adjustment was required, the receptacle had to be removed in order to turn the locking screw.

The above referenced invention overcomes the difficulties of the prior art devices as will be apparent from the more detailed description hereinafter and further has the advantage in permitting the electrical receptacle to be removed for inspection, repair or installation of another receptacle by simply turning the screw one-quarter turn for removal and returning the locking screw to its original position after re-installation.

In another form of the invention, the locking screw can be used as a conventional screw by the installer if the latter desires by simply clinching or removing all or part of the upstanding portions of the head, as also will be clear from a more detailed description hereinafter.

Other and additional features and advantages of the present invention may be understood from the following detailed description and the accompanying drawings, wherein:

FIGURE 1 is a perspective view showing the various parts of an electrical outlet in the manner in which the invention is used;

FIGURE 2 is a side elevational view illustrating the electrical outlet in assembled form;

FIGURE 3 is an enlarged detail view of the locking screw as it locks the electrical receptacle within the outlet box;

FIGURE 4 illustrates the locking screw with the head thereof inserted in the elongated opening of the electrical receptacle;

FIGURE 5 illustrates the manner of locking the sides of the outlet receptacle openings by the screw head;

FIGURE 6 illustrates another form of a locking screw constructed in accordance with the teachings of this invention; and FIGURE 7 illustrates somewhat schematically the grounding path provided in accordance with the embodiment illustrated in the aforedescribed figures.

Referring now to the accompanying drawings in detail, and in particular FIGURE 1 thereof, it can be seen that there is disclosed an outlet box 10 installed in a conventional manner on a 2 x 4 upright 11 behind the conventional wall of lath 12 and plaster 13 with the inwardly turned ears 14 and 15 of the outlet box exposed by hole 16 in the plaster and lath so that wires 18 may be connected in a conventional manner to extensions 20 of a conventional outlet receptacle 21. Outlet receptacle 21 is provided with a mounting plate 22 which is provided near its extremities with elongated openings 23 and 24 spaced apart to correspond with the threaded openings 25 and 26 respectively in ears 14 and 15 of the outlet box 10 so that the electrical receptacle may be fastened or installed therein. As shown in FIGURE 4, opening 23 has a maximum longitudinal dimension 23a, and a minimum width 23b separating oppositely oriented, parallel edges 231 and 232. Mounting plate 22 is also provided with conventional tapped holes 27 and 28 so that a conventional wall plate 30 may be placed over the electrical outlet in a conventional manner.

The outlet receptacle 21 houses conventional electrical connectors as terminals for the connecting wires 20. There are accordingly two openings 22a and 22b for receiving the pair of prongs of a regular connector plug. Additionally there is an opening 22c for receiving the ground connector prong of the plug, if the plug has such prong. In the interior of opening 22c there are connecting means illustrated schematically only in FIGURE 7, such as a resilient connector 221 for receiving the ground connector prong of a plug 222. An internal wire or connecting piece 223 connects permanently the contacts 221 to the mounting plate 22.

In the conventional installation of the electrical conduits, the outlet box 10 is placed in a position aforesaid and the conventional manner of mounting the electrical outlet therein is to insert conventional screws through the elongated openings 23 and 24 and thence into the tapped openings 25 and 26 of the ears 14 and 15.

As previously mentioned, the conventional electrical receptacle usually requires that its plaster ears 32 and 33 formed on the mounting plate 22 engage the plaster surrounding the opening 16. However, during the roughing work, a portion of this plaster may be broken away, as illustrated at 34, in which case the conventional method of mounting such a receptacle is difficult inasmuch as it could not be aligned flush with the plaster wall so that unless other means are resorted to for providing a support for the plaster ear, the receptacle is unsupported and will always be in an unsatisfactory condition. In any event, if the plaster support for the plaster ear is broken, to correct the situation is time consuming and costly. Also, under adverse working conditions, it is difficult to place the conventional mounting screw first through one of the openings such as 23 and thence into one of the tapped openings such as 25 or 26 and start the threading without injuring the threading, damaging the outlet box or to attempt to place both of the conventional mounting screws through both of the openings 23 and 24 in the receptacle plate and then through both of the tapped openings 25 and 26 in the outlet box and, in any event, it is most difficult to align the electrical receptacle with the wall in the conventional manner, and it is to improving the installation of the electrical receptacles that this invention pertains and will now be described.

Turning now to FIGURES 1, 3, 4 and 5, it can be seen that a locking screw 35 is provided with a threaded shank 36 and a head indicated in its entirety as 37 which comprises a shoulder or flange 38 and a pair of upstanding portions 40 and 41 which are cylindrical in their outer periphery with a diameter 401 which is smaller than the distance 23b between the edges 231 and 232 of the opening 23. The two upstanding portions 40 and 41 define therebetween a slot 42 having the length 401 and being provided to receive a screwdriver to turn the locking screw 35 into the tapped bores 25 or 26. Flange or shoulder 38 has a diameter 38d and thus wider than the narrowest width 23b of the elongated openings 23 or 24. Flange 38 provides a stop on its top surface 43 for the mounting plate 22 while, at the same time, the upstanding portions 40 and 41 are smaller than the smallest dimension of the openings 23 and 24. As can be seen clearly in FIGURE 3, the upstanding portions 40 and 41 may be spread apart by a screwdriver or other suitable device by rocking slightly the screwdriver 42. As a result of this deformation diametrically opposed upper edges of portions 40 and 41 are spread apart to the distance 402 larger than diameter 401. Thus, the dimensions of portions 40 and 41 are not or only to a negligible extent changed in the direction of extension of the slot 42. On the other hand, the deformation provides for overhung surface portions 44 and 45, to clinch or lock mounting plate 22 against shoulder 43 when the latter is aligned flush with the wall. As can be seen best from FIGURE 3 the metallic mounting plate 22 thus makes intimate electrical contact with shoulder 38 of the head 37 which is a part of the metallic screw 35. The shank 36 of this screw in turn makes electric contact with the ear 14 at opening 25 wherein the shank 36 is threadedly received. Thus there is a positive electrical connection between the metallic outlet box 10 and the mounting plate 22.

Thus in installing the locking screw 35 instead of inserting the same through one of the elongated openings such as 23 in the mounting plate, the installer first inserts the locking screw into one of the tapped holes such as 25 and then turns the locking screw to a depth approximating the wall such as shown in FIGURE 2. The installer then repeats this operation by installing another locking screw into the tapped hole 26. Then, having thus obtained an approximate or rough estimated position of the distance that the outlet receptacle will be inserted into the outlet box and having electrically connected the wires 18 of the extensions 20 of the receptacle, the installer then mounts the receptacle on the screw heads 37 by placing the openings 23 and 24 over the upstanding portions and against the shoulders 38 of the respective screws; and then again aligning the receptacle with the wall, turns the screwdriver slot 42 so that its axis is parallel with the major axis of the openings 23 and 24, deforms the slot 42 and spreads apart the upstanding portions 40 and 41, as more clearly shown in FIGURES 3 and 5, by rocking a screwdriver or other instrument in the slot so that the edges 231 and 232 of the openings of the mounting plate 22 are clinched or locked by overhung surfaces 44 and 45 against the shoulder, and the receptacle 21 is thus positioned with respect to the outlet box 10 and the wall without reliance on the plaster surrounding the outlet box. Of course, prior to the deformation, if the installer sees that the mounting plate 22 is not properly aligned, he can at that time provide a more refined adjustment with the mounting plate 22 in position on the screw head by simply turning the screw 37 one-half or more turns in either direction as required before placing them in the position such as shown in FIGURE 5 for clinching or locking the mounting plate in position. It is important to note that in connection with this refined adjustment, it is unnecessary for the installer to remove the mounting plate.

Referring now to FIGURE 7, it is repeated what was stated above that the mounting plate 22 is in electric connection with the connector 221 which engages the ground connector prong of a plug when inserted into the outlet. This connection is established by a connector piece 223 which is permanently installed in receptacle 21. Thus, the mounting device which locks the receptacle to the wall inherently includes an electrical circuit path which extends from the portion of the receptacle 21 to be grounded which is the mounting bar 222, to the respective heads 37 of the screws, and from the shanks 36 of the screws to the ears 25 and 26 and to the outlet box 10 which of course is naturally grounded. The same provisions which ensure that the mounting device positively positions the receptacle 21 in box 10, also establish a positive electrical connection of receptacle 21 to ground as soon as the screws are locked into position. It should be noted, that the ground connection is not just established by providing closed contact conditions. The deformed head of the screw clamps the plate 22 against shoulder 38, so that the connection will not be broken if, for example, a person inserts a plug into the outlet rather forcefully.

As heretofore mentioned, another feature of the invention is the simplicity with which the electrical receptacle may be removed. Inasmuch as the deformed outer edges 44 and 45 which clinch the mounting plate against the shoulder themselves form an elongated projection, it is simply necessary to turn the head of the screw one-quarter turn so that the slot is parallel to the minor axis of the opening. The dimensions of portions 40 and 41 were not changed in the direction or extension of the slot 42 during the previous deformation. Thus, the diameter 401 of portions 40 and 41 can still clear the distance 23b between edges 231 and 232, and in this unlocking position the portions 40 and 41 can be retracted from slot 23. The electrical receptacle may thus simply be removed so that the wiring behind the same can be viewed. Reinstallation of the receptacle requires only leaving the screws in their previous position for removal and inserting the plate again over these projections and turning the latter to their locking position such as shown in FIGURE 5. If necessary, the upstanding portions may be again deformed slightly to clinch more securely the mounting plate in the head of the locking screw by a slight rocking movement of the screwdriver as done in the original installation. At the same time the connectors 221 in aperture 21c are again positively connected to ground. This method of installation is also the same if a new receptacle replaces the previous receptacle.

Turning now to FIGURE 6, it can be seen that the mounting screw 35a has a head 36a in which the screwdriver slot 42a extends into the shoulder 38a. With this embodiment of the invention, the adaptability of the locking screw is increased by reason of the fact that if the installer desires to use the locking screw in the conventional manner, he simply has to snap or cut off all or part of the pairs of upstanding portions 40a and 41a, leaving at least the extension of of the slot 42a into the shoulder 38a.

While the above description of the invention has been described in connection with an outlet receptacle, it is clear that any other wiring device such as a switch can be installed in the same manner as the outlet receptacle is installed in the above description; and while the invention was described in connection with the installation of a receptacle in a plaster wall, obviously the invention can be used for installation in walls of paneling or dry wall construction or any other form of construction inasmuch as the invention allows the installer to align the switch under all conditions; and further while only a single embodiment of the present invention is disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

What is claimed is:

1. The arrangement for mounting an electrical receptacle in a grounded outlet box, the receptacle having means for receiving a pair of connector plugs and a ground connector prong, comprising:

a metallic mounting bar for the receptacle in electrical connection with the ground connector prong receiving means in the receptacle, there being at least one elongated opening in the mounting bar;

means in electrical connection with the grounded outlet box and having at least one threaded bore registering with the slot of the mounting bar when the receptacle is placed into the outlet box for mounting thereto; and a locking screw having a threaded shank received by said threaded bore and making electrical connection therewith, the screw having a shoulder wider than the narrow dimensions of the elongated slot, said mounting bar for resting on said shoulder, the screw having means defining a screwdriver slot and projecting from the shoulder through said elongated opening, the slot defining means having dimensions in direction of the slot extension smaller than said shoulder, the slot defining means being deformed to clamp the shoulder of the screw against the metallic bar in at least a first relative angular position of said screw in relation to said threaded bore, while disengaging the metallic bar from the shoulder upon rotation of the screw by approximately 90 degrees.

2. A fastening and connecting device comprising:

a first element having a threaded bore and a particular electrical potential, the first element being provided for anchoring to a permanent supporting structure;

a second element for mounting to said first element and having a metallic mounting portion to be connected to said first element for receiving the said potential, the mounting element including at least one elongated slot;

a screw having a threaded shank received by said threaded bore, further having a shoulder having dimensions wider than the narrow dimension of said elongated slot, further having two upstanding portions defining a screwdriver slot and extending from the shoulder through the elongated slot, the upstanding portions being a widened screwdriver slot thereby clamping the mounting portion at the edges of the elongated slot against the shoulder without impeding rotation of the screw, the mounted portion when clamped against the shoulder being positively electrically connected to the first element via said screw.

3. In a device of the character described, a receptacle having a metallic bar, there being an elongated slot being large in a first linear dimension and small in a second linear dimension orthogonal to the first linear dimension;

a mounting screw having a threaded shank for being threadedly received in a threaded bore, the screw having a flange on the shank defining a shoulder, the screw having screwdriver slot defining means on the shoulder, smaller in any dimension than the size of the shoulder in respective parallel planes, the slot defining means being smaller in any direction coplanar with the extension of the shoulder, than the small size of the slot in said second dimension, the slot defining means on the shoulder projecting through the elongated slot and clamping the screw to the mounting bar when the screwdriver slot extends in said first linear dimension, while disengaging from the mounting bar when upon rotation of the screw the screwdriver slot extends in the second linear dimension.

4. An arrangement for electrically and mechanically connecting an electrical receptacle to a receiving box, comprising in combination:

a pair of metallic ears on the receptacle, each having an elongated opening;

a pair of metallic ears on the receiving box, each having a threaded bore;

a pair of locking screws for locking a receptacle to the box, each screw of the pair being individually adjustably insertable in one of the threaded bores, each screw having a threaded shank and a head thereon, the threaded shank for insertion into one of the threaded bores in the box to make electrical contact with the box and for mounting of the screw to the box;

said head being formed with a shoulder and a pair of upstanding portions forming between the latter a screwdriver slot;

said upstanding portions being slightly smaller than either of the openings so as to be insertable therethrough and being also smaller than said shoulder, said shoulder being larger than the smallest diameter of the opening as defined by oppositely oriented edges to engage said metallic bar at the edges of said opening when the upstanding portions project through the opening;

said upturned portions after insertion through said opening being spread apart substantially perpendicularly only to the extension of the screwdriver slot by widening the screwdriver slot for locking and electrically connecting said shoulder and said edges of said opening together and for selectively coacting in a turnbutton manner with said edges to disengage the opening from the locking screw for contact breaking, when said screwdriver slot extends substantially perpendicular to the long dimension of the elongated opening when the upstanding portions project through the opening;

said upturned portions after insertion through said opening being spreadable apart substantially perpendicularly only to the extension of the screwdriver slot by widening the screwdriver slot for locking and electrically connecting said shoulder and said edges of said opening together and for selectively coacting in a turnbutton manner with said edges to disengage the opening from the locking screw for contact breaking, when said screwdriver slot extends substantially perpendicular to the long dimension of the elongated opening.

5. In combination, an electrical receptacle having at least one elongated opening;

stationary means defining a threaded aperture;

a locking screw having a threaded shank and a head thereon, the threaded shank being received by the aperture;

stop means and means defining a screwdriver slot on the head;

said means defining said screwdriver slot being slightly smaller than the opening so as to be insertable therethrough, and said stop means being larger than the smallest diameter of the opening to engage the edges of said opening; and said means defining said screwdriver slot after having been inserted through said opening being deformed by widening of the screwdriver slot, locking said stop means and the edges of said opening releasably together and to thereby provide positive electrical contact between the edges and the stop means, the size of the means defining the screwdriver slot being substantially unchanged in the direction of extension of the screwdriver slot upon deformation, so that the screw as deformed can be disengaged from the edges of the opening by turning the screw for about 90° relative to the position when locking the stop means and the edges.

6. In combination, an electrical receptacle formed with an elongated opening;

means defining a threaded aperture, the opening to be placed in alignment with the aperture; and a locking screw having a threaded shank received by the aperture, further having a head on the shank, said head being formed with a shoulder and a pair of upstanding portions forming between the latter a screwdriver slot, said upstanding portions being slightly smaller than the opening so as to be insertable therethrough, and said shoulder being larger than the smallest diameter of the opening to engage the edges of said opening when the opening is juxtaposed the upstanding portion, said upturned portions after insertion through said opening having been spread apart by deforming the screwdriver slot when the latter is aligned with the largest axis of the opening to clinch said shoulder and the edges of said opening together, the upturned portions when spread apart and when positioned that the screwdriver slot is transverse to the longest axis of the opening unclinching said shoulder and said edges.

7. In combination with an electrical receptacle including a mounting plate formed with an elongated opening, a locking screw comprising a threaded shank and a head thereon, said head being formed with an annular shoulder having a diameter larger than the smallest transverse dimension of the opening and a pair of substantially semi-cylindrical upstanding portions extending from the upper surface of said shoulder and forming between said upstanding portions a screwdriver slot, the length of said upstanding portions being greater than the thickness of the plate, said slot extending at least to said shoulder, said upstanding portions being inserted through said opening and being divergingly spread apart throughout their length by widening the screwdriver slot, whereby the arcuate outer peripheries of the free ends of the upstanding portions define the extremities of a substantially elliptical configuration with the major diameter of said configuration being greater than said smallest transverse dimension of the opening but less than the largest transverse dimension thereof, and the minor diameter of said configuration being less than said smallest transverse dimension, said shoulder engaging the face of the plate remote from the free ends of said upstanding portions, said upstanding portions being positioned with the major diameter of the elliptical configuration formed thereby extending substantially parallel to the smallest dimension of said opening with the axial extent of said upstanding portions which is adjacent the side edges of said opening bearing against said edges to lock said shoulder and said plate together in juxtaposed relationship, wherein rotation of the locking screw through an angle of substantially 90° will disengage the opening from said screw.

References Cited

UNITED STATES PATENTS

| | | | |
|---|---|---|---|
| 2,048,611 | 7/1936 | Kranz | 174—57 |
| 2,727,985 | 12/1955 | Weiner | 287—20.3 XR |
| 2,740,327 | 4/1956 | Stegeman | 151—42 XR |
| 3,032,736 | 5/1962 | Howells | 339—14 |
| 3,064,224 | 11/1962 | Wiley | 339—14 |

FOREIGN PATENTS 282,959   1/1928   Great Britain.

MARVIN A. CHAMPION, *Primary Examiner.*

PATRICK A. CLIFFORD, *Assistant Examiner.*

U.S. Cl. X.R.

85—9; 151—42; 339—133